US011300969B2

(12) United States Patent
Balogh et al.

(10) Patent No.: US 11,300,969 B2
(45) Date of Patent: Apr. 12, 2022

(54) SYSTEM AND METHOD FOR OPERATING UTILITY VEHICLES

(71) Applicant: KNORR-BREMSE SYSTEME FUER NUTZFAHRZEUGE GMBH, Munich (DE)

(72) Inventors: Levente Balogh, Szigetszentmiklos (HU); Csaba Horvath, Biatorbagy (HU); Huba Nemeth, Budapest (HU); Viktor Tihanyi, Budapest (HU); Peter Frank, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 159 days.

(21) Appl. No.: 16/329,955

(22) PCT Filed: Aug. 14, 2017

(86) PCT No.: PCT/EP2017/070641
§ 371 (c)(1),
(2) Date: Mar. 1, 2019

(87) PCT Pub. No.: WO2018/046252
PCT Pub. Date: Mar. 15, 2018

(65) Prior Publication Data
US 2019/0196491 A1 Jun. 27, 2019

(30) Foreign Application Priority Data
Sep. 8, 2016 (DE) .................... 10 2016 116 857.2

(51) Int. Cl.
*G05D 1/02* (2020.01)
*G08G 1/14* (2006.01)
*G08G 1/16* (2006.01)

(52) U.S. Cl.
CPC ......... *G05D 1/0225* (2013.01); *G05D 1/0214* (2013.01); *G05D 1/0282* (2013.01);
(Continued)

(58) Field of Classification Search
CPC .. G05D 1/0225; G05D 1/0214; G05D 1/0282; G05D 2201/0213; G05D 2201/0216; G08G 1/148; G08G 1/164
See application file for complete search history.

(56) References Cited

U.S. PATENT DOCUMENTS

| 6,278,917 B1 * | 8/2001 | Bauer | G05D 1/0225 |
| | | | 180/168 |
| 2004/0267411 A1 * | 12/2004 | Mayer | G05D 1/0297 |
| | | | 701/1 |

(Continued)

FOREIGN PATENT DOCUMENTS

| CN | 104044629 A | 9/2014 |
| CN | 104837705 A | 8/2015 |

(Continued)

OTHER PUBLICATIONS

International Search Report dated Nov. 24, 2017, of the corresponding International Application PCT/EP2017/070641 filed Aug. 14, 2017.

*Primary Examiner* — Tyler J Lee
*Assistant Examiner* — Yufeng Zhang
(74) *Attorney, Agent, or Firm* — Norton Rose Fulbright US LLP; Gerard Messina; Aaron Deditch (57) ABSTRACT

A system for operating a driverless utility vehicle in a restricted area, including: a transfer module for transferring control of the utility vehicle at an entrance: from the driver of the utility vehicle to the system, and at an exit: from the system to the driver of the utility vehicle, wherein the restricted area has the entrance, the exit and a predetermined target point; a movement module for autonomously moving (Continued)

the utility vehicle from the entrance to the predetermined target point and from the predetermined target point to the exit; and a performance module for autonomously performing an action on the utility vehicle while the utility vehicle is situated at the predetermined target point, so as to change a state of the utility vehicle by the action. Also described are a related management system, a method, and a computer readable medium.

12 Claims, 5 Drawing Sheets

(52) U.S. Cl.
CPC .............. *G08G 1/148* (2013.01); *G08G 1/164* (2013.01); *G05D 2201/0213* (2013.01); *G05D 2201/0216* (2013.01)

(56) References Cited

U.S. PATENT DOCUMENTS

| | | | |
|---|---|---|---|
| 2016/0334797 A1* | 11/2016 | Ross | G06Q 10/08 |
| 2017/0351267 A1* | 12/2017 | Mielenz | G05D 1/0289 |
| 2018/0061237 A1* | 3/2018 | Erickson | G08G 1/0129 |

FOREIGN PATENT DOCUMENTS

| | | |
|---|---|---|
| DE | 10322765 A1 | 1/2005 |
| DE | 102008036660 A1 | 5/2009 |
| DE | 102012021282 A1 | 4/2014 |
| DE | 102014011796 A1 | 2/2016 |
| DE | 102014221777 A1 | 4/2016 |
| DE | 102014224113 A1 | 6/2016 |
| DE | 102014224124 A1 | 6/2016 |
| EP | 1480097 A2 | 11/2004 |
| EP | 2136275 A1 | 12/2009 |
| EP | 2910453 A1 | 8/2015 |

* cited by examiner

SYSTEM AND METHOD FOR OPERATING UTILITY VEHICLES

FIELD OF THE INVENTION

The present invention relates to a system and to a method for operating driverless utility vehicles, and in particular to autonomous operation of utility vehicles in a restricted area.

BACKGROUND INFORMATION

In the use of utility vehicles, transport time and the utilization of the driver's working hours are significant factors for the effectiveness of a vehicle fleet. The majority of transport typically takes place on public roads with standardized rules, which often do not place any high requirements on the driver. Problems may however occur when the utility vehicle is used in specific areas where the surroundings are unique, space is limited and specific maneuvers need to be executed that often place high requirements on the driver. Such specific areas are for example loading stations or goods yards that often do not provide enough space and yet require the driver to maneuver in various directions.

A lot of time is then lost in particular when the driver has to execute specific, non-standardized maneuvers within areas with which he is not familiar and that pose particular difficulties. Especially because the driver often feels uncertain in such situations, the likelihood of accidents is increased. By way of example, accidents frequently occur when the driver has to reverse a utility vehicle into a tight area in a complex environment.

Even though external interfering influences are fairly low in such environments/areas and the speed of the utility vehicle is fairly slow, such systems only offer insufficient solutions in this respect. DE 10 2014 221 777 A1 thus discusses a device that parks a vehicle at a specific position in a parking space and turns it off on the basis of a digital map. DE 10 2014 011 796 A1 discusses a further system for the autonomous navigation of vehicles, in which the vehicle is moved from a starting position to a target along a calculated path. EP 2 910 453 A1 discusses a further autonomous vehicle system, in which the vehicle follows markings inside a car park or a parking area so as to enable the vehicle to be parked. EP 2 136 275 A1 discusses a system that automatically guides a vehicle along a path, and does so within an area.

However, these systems are incomplete as the driver either always retains responsibility for the vehicle or else the system only takes over relatively simple control operations for the vehicle (that is to say acts as an active navigation system). Furthermore, these documents deal with typical applications for passenger vehicles. For utility vehicles, searching for a parking space is not as important as it is for passenger vehicles. Instead of this, it is often important for utility vehicles to execute specific actions on the vehicle, such as for example loading or unloading, maintenance, refueling, cleaning the vehicle or else navigating other transport arrangement (for example driving onto a train). The cited documents do not disclose any solutions for these cases of application.

There is therefore a need for further automated or semi-automated operations that are able to be executed within areas without interaction with a driver.

SUMMARY OF THE INVENTION

At least some of the abovementioned problems may be solved by a system for operating a driverless utility vehicle as described herein, an associated method as described herein and a management system as described herein. The further descriptions herein define further advantageous embodiments.

The present invention relates to a system for operating a driverless utility vehicle in a restricted area. The restricted area comprises an entrance, an exit and a predetermined target point. The system comprises a transfer module, a movement module and a performance module. The transfer module is configured to transfer control of the utility vehicle at the entrance from the driver of the utility vehicle to the system, and at the exit from the system to the driver of the utility vehicle. The movement module is configured to move the utility vehicle from the entrance to the predetermined target point and from the predetermined target point to the exit autonomously, in particular in a driverless manner. The performance module is configured to perform an action on the utility vehicle autonomously while the utility vehicle is situated at the predetermined target point, so as to change a state of the utility vehicle by way of the action.

A restricted area in the context of the present invention should be understood to mean any area in which regulations are present to the extent that for example access monitoring (for example for individuals) is performed and there is a restriction with regard to vehicle movements. A restricted area is thus intended to comprise in particular areas such as for example loading yards, loading and unloading stations, ferries, aircraft, ships, rail transport arrangement and more. The entrance and the exit may optionally be situated at one and the same location or constitute only different roadways of an entrance.

The term "autonomous" should be understood such that the activity characterized thereby is able to be executed without human input. In particular, the execution does not require any individual to be present—not even for monitoring purposes. Furthermore, the term "operate" should be understood broadly and should not be understood to mean only a movement of the utility vehicle, but should rather also encompass an actuation of any desired actuators of the utility vehicle. This includes for example a height adjustment (for example of a loading surface), actuation of tailgates, coupling/decoupling of a trailer, actuation of a braking device, starting/turning off of machines, etc.

It is understood that the modules defined in the context of the present invention may in particular also be implemented by software in a control unit of the utility vehicle or of another system, such that the control unit of the utility vehicle is able to provide the described functions.

The performance module may optionally be configured to perform the action autonomously, that is to say without interaction with the driver of the utility vehicle or another individual.

The performance module is optionally furthermore configured to change at least one of the following states of the utility vehicle by way of the action: an energy charge state, a loading state, coupling or decoupling of vehicle parts, a global position of the vehicle, soiling of the outer surface of the vehicle, a service state of the vehicle or of one of its components.

The movement module and/or the performance module is/are optionally configured to move the utility vehicle autonomously and/or to perform the action autonomously only when the driver has left the utility vehicle (is no longer in the driver's cabin).

The utility vehicle may have a sensor unit and vehicle actuators for operating the utility vehicle. In this case, the movement module may be configured to obtain sensor data from the sensor unit and to drive the vehicle actuators on the basis of the sensor data in order to operate the utility vehicle autonomously.

The sensor unit may for example have surroundings sensors and the movement module may optionally be configured to recognize obstacles during the autonomous movement using the surroundings sensors and, on the basis of this, to change a movement path from the entrance to the predetermined target point or from the predetermined target point to the exit, to use an alternative path or to interrupt a movement.

The system may optionally have an assistance module that is configured to request support from an operator of the system when the movement module is not able to take an alternative path or interrupt the movement.

The sensor unit may comprise a position sensor and a sensor for determining the orientation of the utility vehicle, and the movement module may optionally be configured to park the utility vehicle at the predetermined target point at a defined orientation.

The restricted area may be able to be controlled by a management system, and the management system may be configured to plan paths for vehicles in the restricted area. In this case, the system may optionally have a communication interface that is configured to produce a connection with the management system of the restricted area so as to obtain data for a planned path in the restricted area. The management system may be accessed in this case in particular via a radio module, which is already situated in the vehicle or is configured as part of the communication interface.

The movement module is optionally configured to move the utility vehicle autonomously along the planned path to the further target points within the restricted area, so as to execute further actions at the further target points or to temporarily park the utility vehicle. The communication interface may furthermore be configured to obtain information about actions at the further target points.

The movement module may furthermore optionally be configured to determine target points for the utility vehicle on the basis of information depending on actions that the driver of the utility vehicle or that a driver of other vehicles have performed previously. By way of example, the utility vehicle may be autonomously controlled such that it follows a route (including potential waiting points) that another vehicle has taken previously or else the driver himself has driven with the utility vehicle (for example for learning purposes).

The system optionally comprises an information module that is configured to show and/or acoustically indicate the autonomously executed actions in the restricted area, such that surroundings of the utility vehicle obtain information regarding the autonomously executed actions.

The present invention also relates to a management system having a communication interface and a control unit. The communication interface is configured to produce a communication connection with a system as was described above. The control unit is configured to perform planning and coordination for a self-driving utility vehicle in the restricted area.

The present invention also relates to a method for operating a driverless utility vehicle in said restricted area. The method comprises the following steps:

transferring control of the utility vehicle at the entrance from the driver of the utility vehicle to the system, and at the exit from the system to the driver of the utility vehicle;

autonomously moving the utility vehicle from the entrance to the predetermined target point and from the predetermined target point to the exit; and autonomously performing an action on the utility vehicle while the utility vehicle is situated at the predetermined target point, so as to change a state of the utility vehicle by way of the action.

This method may likewise be implemented or stored in the form of instructions in software or on a computer program product, wherein stored instructions are capable of executing the steps according to the method when the method runs on a processor (for example one of the vehicle control units). Therefore, the present invention likewise relates to a computer program product having software code (software instructions) stored thereon that is configured to execute one of the methods described above when the software code is executed by a processing unit. The processing unit may be any form of computer or control unit that has a corresponding microprocessor that is able to execute a software code.

At least some of the abovementioned technical problems are therefore solved by a system according to exemplary embodiments in that the driver transfers the utility vehicle to the system, such that the driverless utility vehicle is operated by a system in the restricted area. Working hours (driving hours) of the driver are thus saved, and the utility vehicle is used efficiently.

In comparison with known systems, exemplary embodiments offer the following advantages:

The risks of accidents are significantly reduced, as the driver is replaced by the system, which autonomously takes over the vehicle within the restricted area and at the same time executes a predetermined action on the vehicle. The driver is completely decoupled from interaction with the utility vehicle. The driver in particular does not need to monitor the loading or unloading or the maintenance or refueling of the vehicle. These activities are executed automatically by the system, such that the driver does not need to be available in the vehicle. Since the autonomous operations are executed in a restricted area and individuals are therefore able to be refused entry or only have limited access, exemplary embodiments likewise ensure a high degree of safety.

The exemplary embodiments of the present invention will be better understood from the following detailed description and the attached drawings of the various exemplary embodiments, which however are not intended to be understood such that they restrict the disclosure to the specific embodiments, but rather serve merely for the purposes of explanation and understanding.

DETAILED DESCRIPTION

Figure 1:
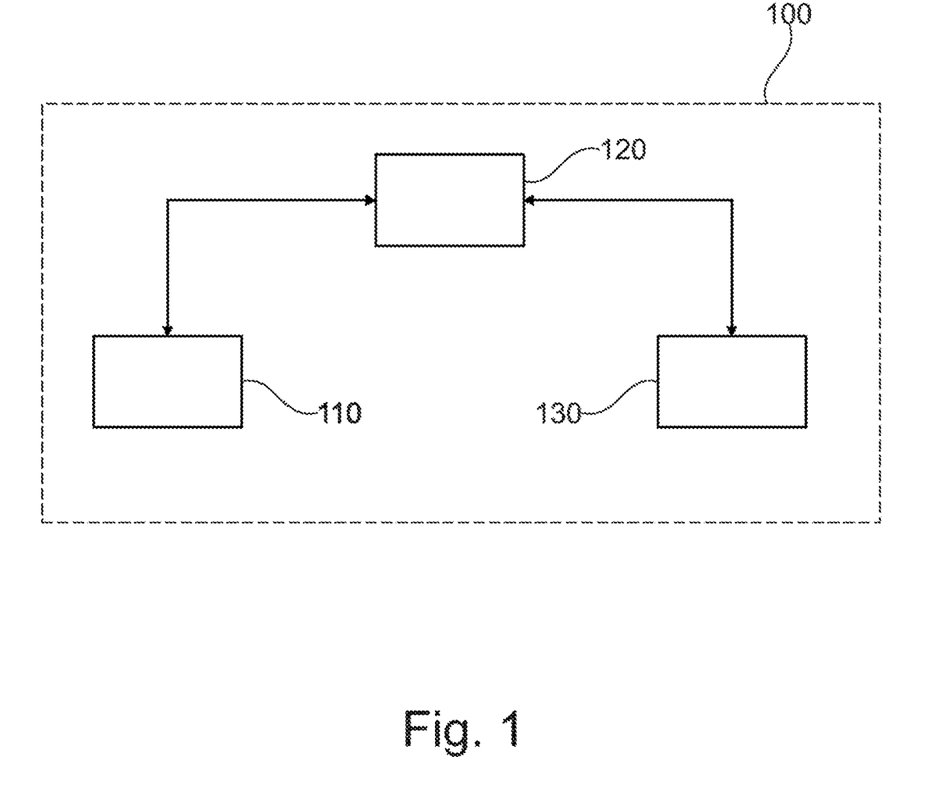
FIG. 1 shows an exemplary embodiment for a system for operating a utility vehicle without a driver in a restricted area.

FIG. 1 shows an exemplary embodiment for a system 100 that is suitable for operating a utility vehicle in a restricted area, without a driver having to be present in the utility vehicle. The restricted area comprises an entrance, an exit and has a predetermined target point. The system 100 comprises a transfer module 110, a movement module 120 and a performance module 130. The transfer module 110 is configured to transfer control of the utility vehicle, and to do so at the entrance: from the driver of the utility vehicle to the system, and at the exit: from the system to the driver of the utility vehicle. The movement module 120 is configured to move the utility vehicle from the entrance to the predetermined target point 201 and from the predetermined target point to the exit autonomously. The performance module 130 is configured to perform an action on the utility vehicle autonomously while the utility vehicle is situated at the predetermined target point. This action changes a state of the utility vehicle.

The system is therefore capable of moving the utility vehicle within the area and performing position changes autonomously. It is possible in particular for one or more target points within the area to be traveled through in a particular order. At the predetermined target point, a management system of the restricted area may make particular changes to the vehicle during the stop. A typical action is for example loading or unloading, but also cleaning or maintenance of the utility vehicle or refueling or recharging of batteries (or changing of a general energy charge state) or any desired combination thereof.

The system 100 may be fully or partly implemented by software that is installed in a control unit of the utility vehicle or in another system in order to execute the described functions. The other system may in particular be outside the utility vehicle (for example be part of the management system).

Figure 2:
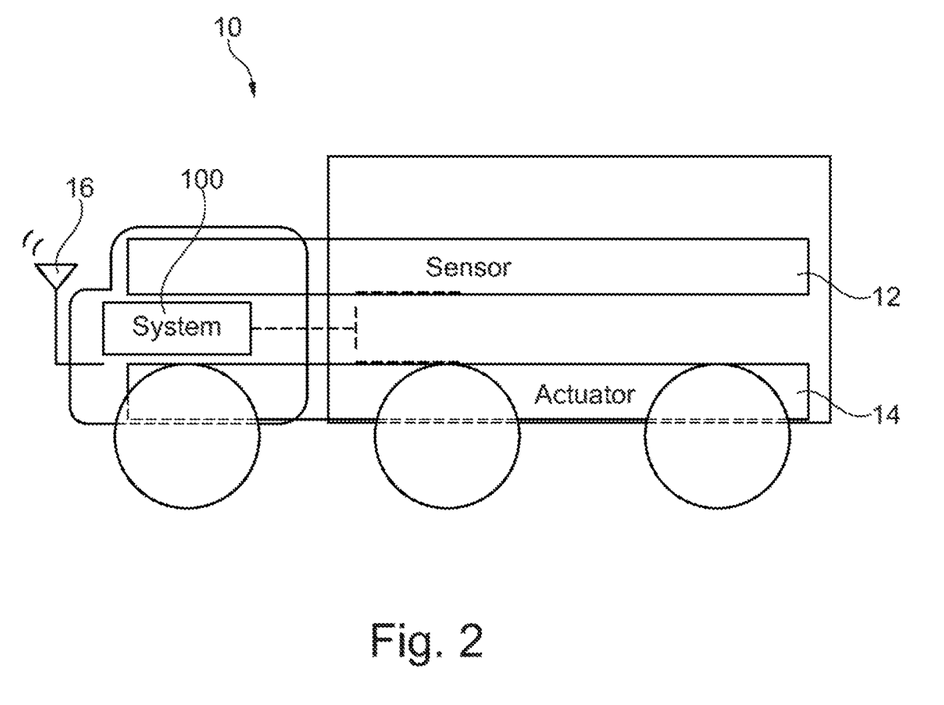
FIG. 2 shows a vehicle as may be used in exemplary embodiments.

FIG. 2 shows an exemplary embodiment for a vehicle 10, in particular a utility vehicle, which is able to be used so as to be operated autonomously within the restricted area. The utility vehicle 10 comprises the system 100, which may be installed for example inside a controller of the vehicle 10 or be accommodated in the vehicle 10 as separate hardware.

The utility vehicle 10 furthermore comprises at least one sensor unit 12 that is configured to detect surroundings of the vehicle 10 (for example to determine distances to other objects or to detect changes in movement or changes in speed). The utility vehicle 10 furthermore comprises a multiplicity of vehicle actuators 14, which are configured for example to control the vehicle 10 along a path. These include in particular steering and brake actuators that steer or brake the vehicle 10. These also include vehicle actuators 14 that are able to accelerate the vehicle 10. The vehicle optionally comprises a dedicated communication module 16 that is able to produce a radio connection with an external network. The system 100 may be configured for example to use the communication module 16 of the vehicle 10 to obtain data from the external network or to transmit said data thereto. The communication module 16 may furthermore be used to connect the utility vehicle 10 to a management system of the restricted area and to obtain data therefrom for a path to be traveled.

The utility vehicle 10 may comprise for example a bus, a lorry, a traction machine for a trailer or a combination of a plurality of vehicle parts (including a trailer).

Figure 3:
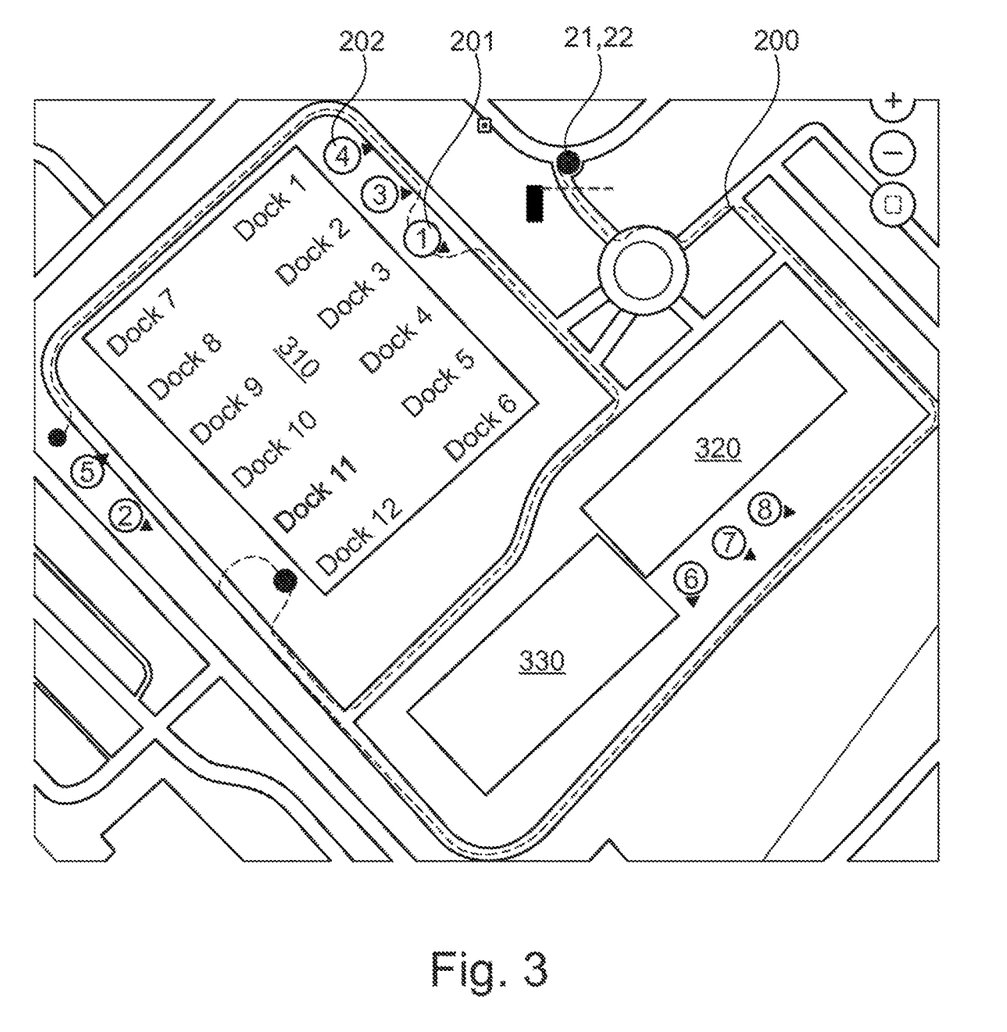
FIG. 3 shows an exemplary restricted area.

FIG. 3 shows an exemplary restricted area that has an entrance 21. Access monitoring may be provided at the entrance 21 such that it is ensured that only the utility vehicle 10 or vehicles that meet the requirements of the restricted area are active in the restricted area. The utility vehicle 10 may for example be a vehicle, as is shown in FIG. 2.

The restricted area that is shown may be managed by a management system. The management system may be configured for example to determine a path 200 for a utility vehicle 10 that registers appropriately at the entrance 21, the utility vehicle 10 then being able to travel this path autonomously. This management system may in particular define the points and the order in which the points should be traveled through. The management system may furthermore provide a path specification for the series of waypoints (for example which turns should be made at which positions). It is optionally likewise possible for the management system to supply data that should be considered to be constraints for planning a path along the series of waypoints.

The path 200 leads for example past various buildings 310, 320, 330, which are able to be detected for example by the sensor unit 12 of the utility vehicle 10 using a surroundings sensor system. The path 200 then leads for example to two predetermined target points 201, 202, which are docking stations at a warehouse 310, for example, where the utility vehicle 10 docks and performs loading and unloading activities, for example. Potential further target points are the stations "1", "2", . . . , "8", at which further actions may optionally be performed (for example depending on the type of utility vehicle). It is understood in the context of the present invention that even more intermediate points may be defined at which no actions are executed on the vehicle 10, but rather the vehicle waits in a parking position, for example. The parking may in this case be only temporary or else for a relatively long time interval.

The management system of the restricted area may furthermore plan and/or control the actions to be executed on the vehicle 10 at the various target points 201, 202 or the further stations within the area. To this end, the movement module 120 may obtain planning data from the management system and navigate the vehicle 10 autonomously to the various target points. After all of the planned actions have finished, the movement module 120 may navigate the vehicle 10 autonomously to the exit 22. The exit 22 may be the same point as the entrance 21, at which the driver of the vehicle 10, using the transfer module 110, is able to take back control of the vehicle 10 and drives the vehicle 10 out of the restricted area through manual driving.

The system 100 may likewise comprise interfaces to the vehicle sensor unit 12 and to the vehicle actuators 14 in order to establish a state of the vehicle 10 and of the surroundings (for example detect the buildings 320, 330, 310 or a relative orientation with respect thereto) and, on the basis thereof, to control the vehicle state, and do so without assistance from the driver being necessary for this purpose. This may be for example an interface to the management system of the restricted area, such that the management system retains access to the vehicle 10 is able to access components of the vehicle. This interface may allow wireless communication, for example.

The restricted area that is shown may be managed by an operator, for example. The operator may in particular be or comprise the management system that is configured to ensure automated operation for the restricted area. The management system may however optionally likewise be operated by an individual or at least partly controlled or monitored so as to ensure the safety of the restricted area.

According to further exemplary embodiments, it is likewise possible to define a journey between the target points such that a path that has been taken previously is repeated.

By way of example, a path may have been originally traveled manually by the driver and movement data may have been captured. The movement module 120 is then configured for example, on the basis of the movement data, to allow the utility vehicle 10 to travel autonomously along the recorded path.

The restricted area that is shown constitutes just an example. The system 100 is however in particular also able to be used in areas where high accuracy in terms of the navigation of the vehicle 10 is necessary within a short time, and in which damage often occurs when utility vehicles 10 are operated manually. Especially in such areas, the system 100 ensures safe operation of the utility vehicle 10. By way of example, these areas are other transport vehicles (a ferry, a train, an aircraft, a road train, etc.) on which the utility vehicle 10 is intended to be parked with high precision. In this case, the movement of the utility vehicle 10 (change in its global position together with the transport vehicle) is the action that is performed in the restricted area. The utility vehicle 10 may thus also adopt a fixed point in relation to the area during the action, and the restricted area (for example the interior of an aircraft) moves.

Figure 4:
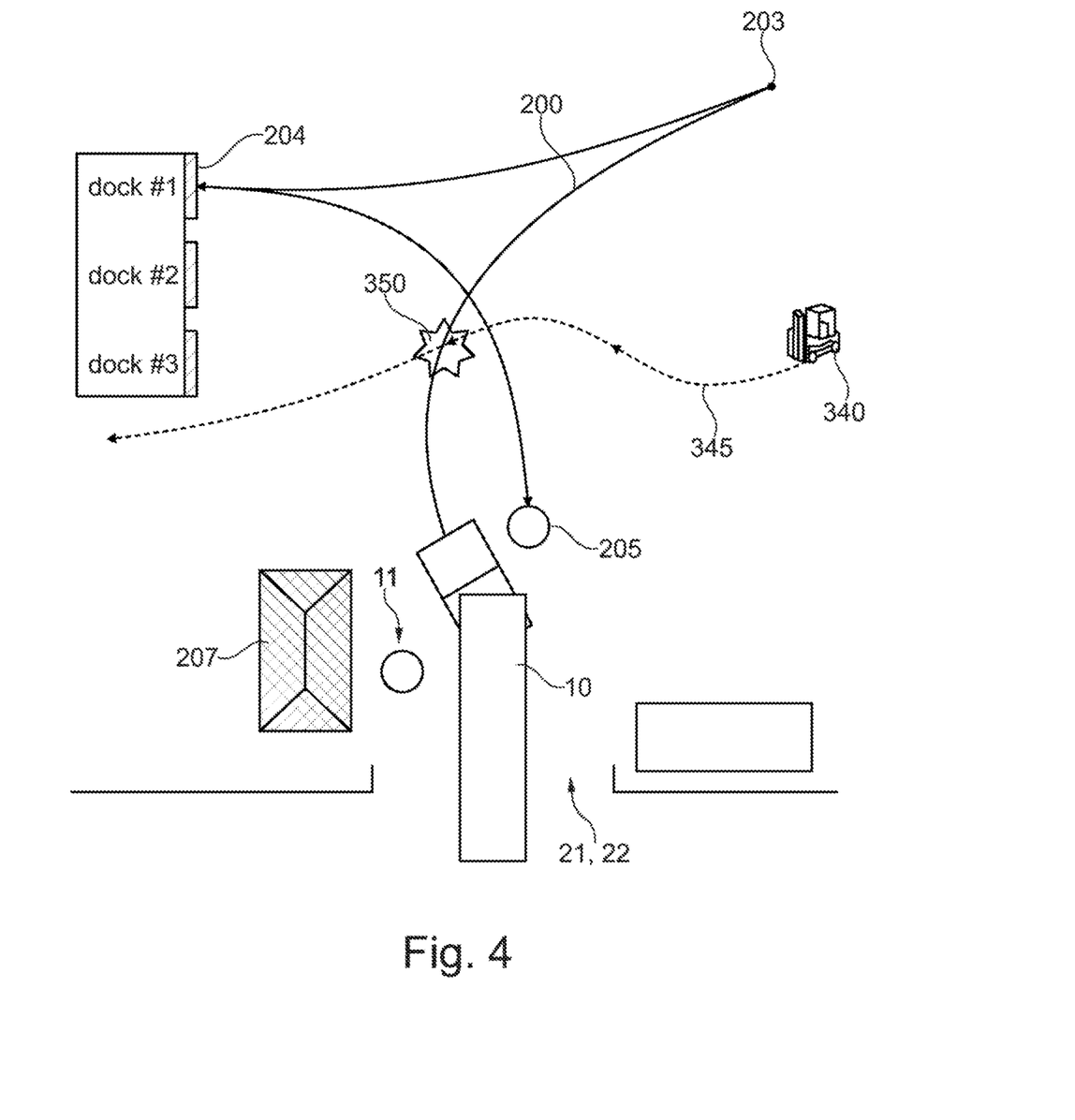
FIG. 4 illustrates possible maneuvers that need to be executed by a utility vehicle in the restricted area.

FIG. 4 illustrates possible maneuvers that need to be executed by a utility vehicle 10 on/in the restricted area. First of all, the vehicle 10 registers at the entrance 21 with the operator/management system 207. In this case, the vehicle 10 may be transferred to the system 100, which registers with the management system for the restricted area. After the utility vehicle 10 has been transferred, the driver 11 may leave the utility vehicle 10. The utility vehicle 10 may then be operated autonomously within the restricted area.

By way of example, FIG. 4 shows a situation in which the utility vehicle 10 may potentially collide with a forklift truck 340 at a position 350. This situation may be handled by the system 100 in that the utility vehicle 10 initially waits in a waiting position until the forklift truck 340 has finished its path 345. The system 100 may then move the utility vehicle 10 further along the path 200 to a turning position 203. At the turning position 203, the movement direction of the utility vehicle 10 is reversed, and reverse docking at a docking station 1 of a building is performed (position 204). At this position 204, the utility vehicle 10 may be loaded, for example.

The system 100 may then obtain corresponding information from the management system as to how long the utility vehicle 10 should wait at the position 204. Following authorization by the management system 200, the system 100 may continue the movement from the position 204. This may be performed for example in that the management system confirms to the system 100 that the loading activity at the docking station 204 has finished and the movement is able to be continued. The system 100 may then autonomously further guide the utility vehicle 10 from the docking station 204 to a parking position 205 (or end point) at the exit 22. At the exit 22, the driver is able to receive the utility vehicle 10 again and drive manually.

FIG. 4 thus illustrates a typical reversal of movement of the utility vehicle 10 that constitutes a high accident risk in complex loading yards when the utility vehicle 10 is operated manually and the driver does not have accurate knowledge of the loading yard. For this reason, the system 100 is able to be used advantageously in particular for such situations.

It is understood that it may be necessary to determine and to monitor the position and orientation of the utility vehicle 10 as accurately as possible, in order thus to be able to efficiently execute the actions at the points within the area. For this purpose, the management system of the restricted area may require for example an accurate position determination by the utility vehicle 10, that is to say, for a successful transfer, it may be necessary for the utility vehicle 10 to have sufficiently accurate and reliable sensors for position determination (for example rangefinders, radar systems, cameras, ultrasound sensors, etc.).

Figure 5:
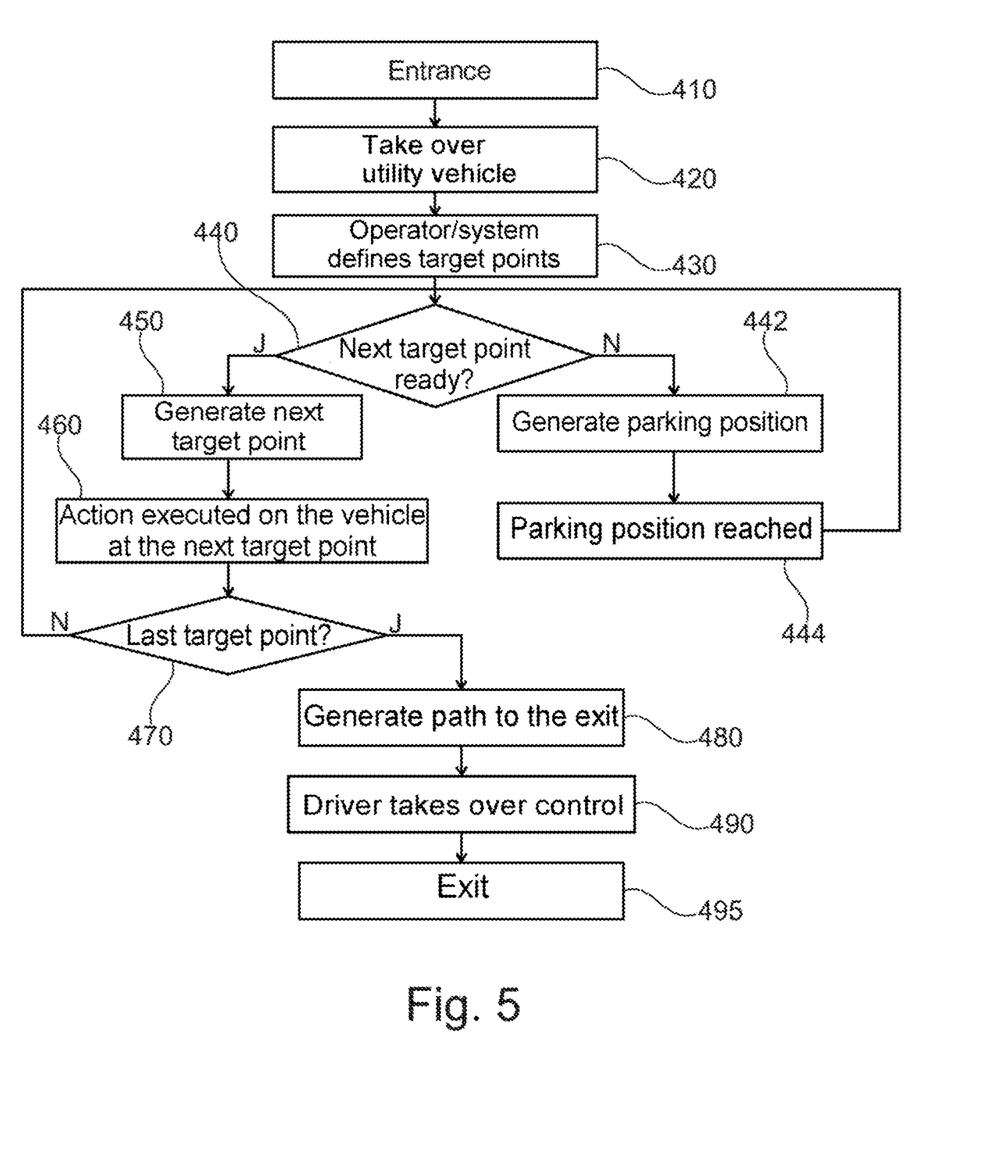
FIG. 5 shows a flow diagram for a method that is executed by the system according to exemplary embodiments.

FIG. 5 shows a flow diagram for a method that is able to be executed for example by the system 100, wherein the system in this case is at least partly integrated into the management system for the restricted area.

In step 410, the restricted area is entered. In step 420, the utility vehicle 10 is taken over by the operator (or the management system) that operates the restricted area using the management system. In step 430, the management system defines target points that are to be traveled through by the utility vehicle 10. In this case, the management system may in particular transfer further information about the path 200 to the defined target points.

In step 440, it is established whether a target point that is the first one or the next one to be traveled through is ready to accept the utility vehicle 10. If so, in step 450, the path to the next target point is generated and, in step 460, the next target point is reached and the action is executed on the utility vehicle 10. When this has been performed, in step 470, it is initially queried whether the target point is a last target point. If so, the management system generates a path to the exit in step 480. In step 490, the driver receives the utility vehicle 10 and takes over control of the utility vehicle 10. And, in step 495, the driver manually drives the vehicle 10 out of the restricted area.

If, at the query 440, the first or next target point should not yet be ready to accept the utility vehicle 10, in step 442, the utility vehicle 10 is guided to a parking position, for which purpose a corresponding path to the parking position is generated. In step 444, the vehicle then travels to the parking position and waits there until there is confirmation that the next target point may be traveled to. If this is the case, the utility vehicle 10 follows the previously determined path (step 450).

If the system 100 establishes that the target point that was traveled through in step 460 and the action that was executed there is not yet the last target point in the restricted area, there is a new query as to whether the next target point is ready to accept the utility vehicle 10. This is performed in step 440. If so, the method continues with steps 450 and 460, and if this is not possible, steps 442 and 444 follow, as described above.

The method or at least parts thereof may likewise be computer-implemented, that is to say it may be implemented through instructions that are stored on a storage medium and are capable of executing the steps of the method when it runs on a processor. The instructions typically comprise one or more instructions that are able to be stored in various ways on various media in or peripherally with respect to a control unit (having a processor) that, when they are read and executed by the control unit, prompt the control unit to execute functions, functionalities and operations that are necessary to execute a method according to the present invention.

Further exemplary embodiments of the present invention relate to the following subjects:

A system 100 for a utility vehicle (or a vehicle combination) 10, which is operated at least partly in an area where the entrance 21 and exit 22 are monitored, so as to travel from an entry of the area at least to a predetermined target point at which a predetermined action is executed on the vehicle 10 or the vehicle combination. Furthermore, this position is left and the exit from the area is controlled. This system is characterized in that the action is performed on the vehicle or the vehicle combination 10 autonomously within the area, without the driver being situated in the vehicle or the vehicle combination 10.

The present invention also relates to a system in which responsibility for the vehicle is transferred from the driver to a management system of the area.

Further exemplary embodiments relate to a system 100 in which the predetermined action comprises any desired action that results in a change of at least one vehicle property.

Further exemplary embodiments relate to a system 100 in which the vehicle property is an energy storage level, a loading level, vehicle coupling or decoupling, a global position of the vehicle 10, soiling on the outer surface or a maintenance state with respect to an additional component of the vehicle or the vehicle combination itself.

Further exemplary embodiments relate to a system 100 in which, between leaving the entrance 21 and reaching the exit 22, any desired number of target points may be defined that are controlled by the utility vehicle 10, with or without specific actions having to be executed there.

Further exemplary embodiments relate to a system 100 in which the path 200 of the vehicle or the vehicle combination 10, between the entrance 21 and the exit 22, comprises points within the area to be traveled through and that are determined by the supervisor of the area or are determined by the vehicle 10 on the basis of information provided by the supervisor of the area or based on data from previously performed manual operations by the driver of the vehicle 10 or a driver of another vehicle 10.

The supervisor of the area may optionally define the points to be traveled through and stipulate the orientation of the utility vehicle upon approach.

The system optionally has interfaces to the driver, vehicle sensors, to vehicle actuators and to the supervisor of the area. The interfaces may be part of a mobile device, or have a display or input arrangement.

The features of the invention that are disclosed in the description, the claims and the figures may be essential to implementing the invention both individually and in any desired combination.

THE LIST OF REFERENCE SIGNS IS AS FOLLOWS

10 utility vehicle/vehicle combination
12 sensor unit
14 vehicle actuators
16 communication module
21 entrance
22 exit
100 system
110 transfer module
120 movement module
130 performance module
201, 202 predetermined target points
203 reversing point
204 loading point
205 parking position
207 operator/management system
340 exemplary forklift truck
350 potential intersection
345 path of the forklift truck

The invention claimed is:

1. A system for operating a utility vehicle, which is drivable by a driver, in a restricted area, comprising:
a transfer module for transferring control of the utility vehicle at an entrance: from the driver of the utility vehicle to the system, and at an exit: from the system to the driver of the utility vehicle, wherein the restricted area has the entrance, the exit and a predetermined target point;
a movement module for autonomously moving the utility vehicle from the entrance to the predetermined target point and from the predetermined target point to the exit; and
a performance module for autonomously performing an action on the utility vehicle while the utility vehicle is situated at the predetermined target point, so as to change a state of the utility vehicle by the action;
wherein the movement module is configured to move the utility vehicle so as to avoid a potential collision with another vehicle moving in the restricted area,
wherein the movement module is configured to move the utility vehicle in reverse, including providing reverse docking,
wherein the utility vehicle has a sensor unit and vehicle actuators for operating the utility vehicle, and wherein the movement module is configured to obtain sensor data from the sensor unit and to drive the vehicle actuators on the basis of the sensor data in order to operate the utility vehicle autonomously,
wherein the sensor unit has surroundings sensors, and wherein the movement module is configured to recognize obstacles during autonomous movement using the surroundings sensors and, based on this, to change a movement path from the entrance to the predetermined target point or from the predetermined target point to the exit, to use an alternative path or to interrupt a movement,
wherein the sensor unit includes a position sensor and a sensor for determining an orientation of the utility vehicle, and wherein the movement module is configured to park the utility vehicle at the predetermined target point at a defined orientation,
wherein the performance module is configured to change at least one of the following states of the utility vehicle by the action: an energy charge state of a battery, coupling or decoupling of vehicle parts, and a global position of the vehicle,
wherein the utility vehicle is drivable by an operator outside of the restricted area and is controlled autonomously in the restricted area,
wherein the utility vehicle includes: at least one of: a bus, a lorry, a traction machine for a trailer, and/or a combination of a plurality of vehicle parts, including a trailer,
wherein access monitoring is provided at an entrance of the restricted area to ensure that only the utility vehicle, which meets requirements of the restricted area, are active in the restricted area,
wherein if the utility vehicle is moving so that it potentially collides with another moving object, the utility vehicle initially waits in a waiting position until the another moving object has finished a path of the another moving object, wherein the utility vehicle then moves further along a path to a turning position, and wherein at the turning position, a movement direction of the utility vehicle is reversed, and reverse docking of the utility vehicle at a docking station is performed, and wherein following authorization by the management system, the utility vehicle is autonomously guided from the docking station to a parking position or end point at the exit, where the driver receives the utility vehicle to drive the utility vehicle manually.

2. The system of claim 1, wherein the performance module is configured to perform the action autonomously, without interaction with the driver of the utility vehicle or another individual.

3. The system of claim 1, wherein the performance module is further configured to change a service state of the vehicle or of one of its components.

4. The system of claim 1, wherein the movement module and/or the performance module are configured to move the utility vehicle autonomously and to perform the action autonomously only when the driver has left the utility vehicle.

5. The system of claim 1, further comprising:
an assistance module to request support from an operator of the system when the movement module cannot take an alternative path or interrupt the movement.

6. The system of claim 1, wherein the restricted area is controllable by the management system, and the management system is configured to plan paths for vehicles in the restricted area, further comprising:
a communication interface to produce a connection with the management system of the restricted area so as to obtain data for a planned path in the restricted area.

7. The system of claim 6, wherein further target points lie along the planned path, wherein the movement module is configured to move the utility vehicle autonomously along the planned path to the further target points within the restricted area, so as to execute further actions at the further target points or to temporarily park the utility vehicle; and the communication interface is configured to obtain information about actions at the further target points.

8. The system of claim 1, wherein the movement module is configured to determine target points for the utility vehicle on the basis of information depending on actions that the driver of the utility vehicle or that a driver of other vehicles have performed previously.

9. The system of claim 1, further comprising:
an information module to show and/or acoustically indicate autonomously executed actions in the restricted area, such that surroundings of the utility vehicle obtain information regarding the autonomously executed actions.

10. A management system, comprising:
a communication interface to produce a communication connection with a system, wherein the system is for operating a utility vehicle, which is drivable by a driver, in a restricted area, including:
a transfer module for transferring control of the utility vehicle at an entrance: from the driver of the utility vehicle to the system, and at an exit: from the system to the driver of the utility vehicle, wherein the restricted area has the entrance, the exit and a predetermined target point;
a movement module for autonomously moving the utility vehicle from the entrance to the predetermined target point and from the predetermined target point to the exit; and
a performance module for autonomously performing an action on the utility vehicle while the utility vehicle is situated at the predetermined target point, so as to change a state of the utility vehicle by the action; and a control unit to perform planning and coordination for a self-driving utility vehicle in the restricted area;
wherein the movement module is configured to move the utility vehicle so as to avoid a potential collision with another vehicle moving in the restricted area,
wherein the movement module is configured to move the utility vehicle in reverse, including providing reverse docking,
wherein the utility vehicle has a sensor unit and vehicle actuators for operating the utility vehicle, and wherein the movement module is configured to obtain sensor data from the sensor unit and to drive the vehicle actuators on the basis of the sensor data in order to operate the utility vehicle autonomously,
wherein the sensor unit has surroundings sensors, and wherein the movement module is configured to recognize obstacles during autonomous movement using the surroundings sensors and, based on this, to change a movement path from the entrance to the predetermined target point or from the predetermined target point to the exit, to use an alternative path or to interrupt a movement,
wherein the sensor unit includes a position sensor and a sensor for determining an orientation of the utility vehicle, and wherein the movement module is configured to park the utility vehicle at the predetermined target point at a defined orientation, and
wherein the performance module is configured to change at least one of the following states of the utility vehicle by the action: an energy charge state of a battery, coupling or decoupling of vehicle parts, and a global position of the vehicle,
wherein the utility vehicle is drivable by the driver outside of the restricted area and is controlled autonomously in the restricted area,
wherein the utility vehicle includes: at least one of: a bus, a lorry, a traction machine for a trailer, and/or a combination of a plurality of vehicle parts, including a trailer,
wherein access monitoring is provided at an entrance of the restricted area to ensure that only the utility vehicle, which meets requirements of the restricted area, are active in the restricted area,
wherein if the utility vehicle is moving so that it potentially collides with another moving object, the utility vehicle initially waits in a waiting position until the another moving object has finished a path of the another moving object, wherein the utility vehicle then moves further along a path to a turning position, and wherein at the turning position, a movement direction of the utility vehicle is reversed, and reverse docking of the utility vehicle at a docking station is performed, and
wherein following authorization by the management system, the utility vehicle is autonomously guided from the docking station to a parking position or end point at the exit, where the driver receives the utility vehicle to drive the utility vehicle manually.

11. A method for operating a utility vehicle, which is drivable by a driver, in a restricted area, the method comprising:
transferring control of the utility vehicle at an entrance from the driver of the utility vehicle to the system, and at an exit from the system to the driver of the utility vehicle, wherein the restricted area has the entrance, the exit and a predetermined target point;

autonomously moving the utility vehicle from the entrance to the predetermined target point and from the predetermined target point to the exit; and autonomously performing an action on the utility vehicle while the utility vehicle is situated at the predetermined target point, so as to change a state of the utility vehicle by the action;

wherein the movement module is configured to move the utility vehicle so as to avoid a potential collision with another vehicle moving in the restricted area, wherein the movement module is configured to move the utility vehicle in reverse, including providing reverse docking, wherein the utility vehicle has a sensor unit and vehicle actuators for operating the utility vehicle, and wherein the movement module is configured to obtain sensor data from the sensor unit and to drive the vehicle actuators on the basis of the sensor data in order to operate the utility vehicle autonomously, wherein the sensor unit has surroundings sensors, and wherein the movement module is configured to recognize obstacles during autonomous movement using the surroundings sensors and, based on this, to change a movement path from the entrance to the predetermined target point or from the predetermined target point to the exit, to use an alternative path or to interrupt a movement, wherein the sensor unit includes a position sensor and a sensor for determining an orientation of the utility vehicle, and wherein the movement module is configured to park the utility vehicle at the predetermined target point at a defined orientation, and wherein the performance module is configured to change at least one of the following states of the utility vehicle by the action: an energy charge state of a battery, coupling or decoupling of vehicle parts, and a global position of the vehicle, wherein the utility vehicle is drivable by the driver outside of the restricted area and is controlled autonomously in the restricted area, wherein the utility vehicle includes: at least one of: a bus, a lorry, a traction machine for a trailer, and/or a combination of a plurality of vehicle parts, including a trailer, wherein access monitoring is provided at an entrance of the restricted area to ensure that only the utility vehicle, which meets requirements of the restricted area, are active in the restricted area, wherein if the utility vehicle is moving so that it potentially collides with another moving object, the utility vehicle initially waits in a waiting position until the another moving object has finished a path of the another moving object, wherein the utility vehicle then moves further along a path to a turning position, and wherein at the turning position, a movement direction of the utility vehicle is reversed, and reverse docking of the utility vehicle at a docking station is performed, and wherein following authorization by the management system, the utility vehicle is autonomously guided from the docking station to a parking position or end point at the exit, where the driver receives the utility vehicle to drive the utility vehicle manually.

12. A non-transitory computer readable medium having a computer program, which is executable by a processor, comprising:

a program code arrangement having program code for operating a utility vehicle, which is drivable by a driver, in a restricted area, by performing the following:

transferring control of the utility vehicle at an entrance from a driver of the utility vehicle to the system, and at an exit from the system to the driver of the utility vehicle, wherein the restricted area has the entrance, the exit and a predetermined target point;

autonomously moving the utility vehicle from the entrance to the predetermined target point and from the predetermined target point to the exit; and autonomously performing an action on the utility vehicle while the utility vehicle is situated at the predetermined target point, so as to change a state of the utility vehicle by the action;

wherein the movement module is configured to move the utility vehicle so as to avoid a potential collision with another vehicle moving in the restricted area, wherein the movement module is configured to move the utility vehicle in reverse, including providing reverse docking, wherein the utility vehicle has a sensor unit and vehicle actuators for operating the utility vehicle, and wherein the movement module is configured to obtain sensor data from the sensor unit and to drive the vehicle actuators on the basis of the sensor data in order to operate the utility vehicle autonomously, wherein the sensor unit has surroundings sensors, and wherein the movement module is configured to recognize obstacles during autonomous movement using the surroundings sensors and, based on this, to change a movement path from the entrance to the predetermined target point or from the predetermined target point to the exit, to use an alternative path or to interrupt a movement, wherein the sensor unit includes a position sensor and a sensor for determining an orientation of the utility vehicle, and wherein the movement module is configured to park the utility vehicle at the predetermined target point at a defined orientation, and wherein the performance module is configured to change at least one of the following states of the utility vehicle by the action: an energy charge state of a battery, coupling or decoupling of vehicle parts, and a global position of the vehicle, wherein the utility vehicle is drivable by the driver outside of the restricted area and is controlled autonomously in the restricted area, wherein the utility vehicle includes: at least one of: a bus, a lorry, a traction machine for a trailer, and/or a combination of a plurality of vehicle parts, including a trailer, wherein access monitoring is provided at an entrance of the restricted area to ensure that only the utility vehicle, which meets requirements of the restricted area, are active in the restricted area, wherein if the utility vehicle is moving so that it potentially collides with another moving object, the utility vehicle initially waits in a waiting position until the another moving object has finished a path of the another moving object, wherein the utility vehicle then moves further along a path to a turning position, and wherein at the turning position, a movement direction of the utility vehicle is reversed, and reverse docking of the utility vehicle at a docking station is performed, and wherein following authorization by the management system, the utility vehicle is autonomously guided from the docking station to a parking position or end point at the exit, where the driver receives the utility vehicle to drive the utility vehicle manually.

\* \* \* \* \*